United States Patent [19]

Kowallik et al.

[11] Patent Number: 5,670,061
[45] Date of Patent: Sep. 23, 1997

[54] PROCESS FOR TREATING ASH

[75] Inventors: Wolfgang Kowallik, Itzehoi; Hans Jürgen Maaz, Brunsbüttel, both of Germany; Werner Soyez, Wezembeek-Oppem, Belgium

[73] Assignee: Norsk Hydro a.s., Oslo, Norway

[21] Appl. No.: 437,922

[22] Filed: May 9, 1995

[30] Foreign Application Priority Data

May 11, 1994 [EP] European Pat. Off. .............. 94201329

[51] Int. Cl.$^6$ ................ C02F 11/06; C02F 11/12
[52] U.S. Cl. ................ 210/771; 210/769; 431/2; 423/62
[58] Field of Search ............ 210/620, 630, 210/631, 761, 762, 763, 771, 769; 431/2; 110/215; 423/62

[56] References Cited

U.S. PATENT DOCUMENTS

| | | | |
|---|---|---|---|
| 4,310,422 | 1/1982 | Romey et al. | 210/771 |
| 4,482,460 | 11/1984 | Kandler et al. | 210/771 |
| 4,839,022 | 6/1989 | Skinner | 210/771 |
| 5,156,749 | 10/1992 | Williams | 210/771 |
| 5,462,676 | 10/1995 | Pitts | 210/771 |
| 5,466,383 | 11/1995 | Lee | 210/771 |

FOREIGN PATENT DOCUMENTS 0542322  5/1993  European Pat. Off. .

OTHER PUBLICATIONS

Elvers et al., "Ullmann's Encyclopedia Of Industrial Chemistry", 1990, VCH, Germany, pp. 4–20 and 4–21.
Strelzoff, "Partial Oxidation For Syngas And Fuel", Hydrocarbon Processing, vol. 53, No. 12, Dec. 1974, pp. 79–87.

Primary Examiner—Neil McCarthy
Attorney, Agent, or Firm—Wenderoth, Lind & Ponack

[57] ABSTRACT

Process for the partial oxidation of a hydrocarbon feedstock, comprising the steps of gasification, partial oxidation and removal of the carbon by forming a soot water slurry containing the unburned carbon and ash and filtration of the soot water slurry to form a filtercake of carbon and ash, wherein the filter cake is dried by means of a fluid bed and the dried filtercake is burned at temperatures between 600° C. and 1000° C. Preferably The fluid bed is operated by means of a fluidizing gas at a temperature of at least 150° C. The dried filtercake is burned under circumstances that carbon is left in the resulting ash.

11 Claims, 5 Drawing Sheets

PROCESS FOR TREATING ASH

BACKGROUND OF THE INVENTION

1. Field of the Invention

The invention relates to a process for treating ash originating from the oxidation, such as partial oxidation, of a hydrocarbon feedstock, comprising the step of forming a soot water slurry containing unburned carbon and ash and filtration of the soot water slurry to form a filtercake of carbon and ash.

More specifically the invention relates to an improved process where the soot/ash water slurry is treated in such a way that the resulting product can be directly used in a process for recovering vanadium.

2. Description of the Prior Art

Partial oxidation processes for hydrocarbon feedstocks were developed and commercialized during the 1950's. The best known processes, such as the Shell gasification process and the Texaco gasification process, have been utilized in a number of commercial plants.

Such gasification processes utilizing hydrocarbon feedstock normally comprise three principal steps:

Gasification, in which the feedstock is converted into raw synthesis gas in the presence of oxygen and steam, Waste heat recovery in which high pressure steam is generated from the hot gases leaving the reactor, and Carbon removal, in which residual carbon contained in the reactor outlet gas is removed in a multistep water wash.

Hereby the unburned carbon from the gasifier will be made into a carbon slurry, an aqueous suspension containing soot and a significant amount of ash, depending on the feedstock. For disposal, this slurry is to be further processed and recycled.

Thus, a serious drawback of such processes is that a certain percentage of the feedstock is converted into soot containing also appreciable amounts of ash from the heavy hydrocarbon feedstock.

Traditionally the soot recovery is handled by two alternative routes:

1. The carbon is recovered by means of pelletizing, where a distillate or a residual fuel oil is used to form agglomerates with the carbon particles. The pellets can easily be separated from the water and are recycled to the reactor and/or burned in a carbon oil furnace.

2. Alternatively the carbon slurry is contacted with naphtha in an extractor to form naphtha soot agglomerates. The agglomerates are subsequently decanted or sieved-off and converted into a pumpable mixture together with the feedstock and recycled to the reactor.

However, as the soot is heavily contaminated with ash the disposal of the soot/ash mixtures has gradually become the most serious problem for such gasification processes, due to the resulting built-up in the recycle streams.

The possibility to separate the soot/ash mixture by filtration and to dispose of it directly is considered as an attractive solution, but has not been applied on a large scale.

More specifically, filtration has been used to recover soot for special applications, such as absorbent carbon, conductive carbon and carbon black. However, such applications will not solve the disposal problems in a large gasification plant.

The soot/ash slurry from the carbon separation step will normally contain 0.5–3% unburned carbon and 0.1–2% ash. The ash contains appreciable amounts of Ni, Fe and V. The filtering of such a slurry is extremely difficult. As the water is removed the slurry is gradually turned into a soapy paste which is very difficult to handle by normal filtration means. The final water content of the filtercake will be 85% or higher and the pasty consistency of such a filtercake makes it unsuitable for further handling.

Due to the combustion temperatures needed to burn the soot, the ash content tends to cause excessive corrosion, caking or slag formation and environmental difficulties.

To overcome these handling problems it has been proposed to add other solid matter to the slurry. Thus according to DE-A-4003242 a soot water slurry is mixed with sewage sludge (Klärschlamm), whereafter the excess water more easily can be removed from such mixture. Thereafter the remaining solid sludge can be deposited, but the heavy metals and other contaminations are not taken care of and the disposal problems are not solved.

Otherwise, hydrocarbon feedstock is also used in oxidation processes in order to generate substantially heat, such as in boilers and power generator units. It is possible to have this equipment provided with electric filter devices or the like, for the flue gas, which after having passed said filter normally is submitted to a desulphuration step. In the electric filter a kind of fluid ash is precipitated, which also contains a mixture of unburned carbon and ash. This type of ash is susceptible to be used as a feedstock for the process described above.

SUMMARY OF THE INVENTION

More generally it can be said that any ash resulting from the oxidation of mineral oil products and/or—residues and containing a substantial amount of carbon beside its intrinsic heavy metal compounds is suitable to be used as a feedstock for the process according to the invention.

Another object of the invention is to carry out treatment in a process with good thermal efficiency and practically no emissions of hazardous substances.

It is another object of the invention to provide a burning process in conditions wherein scaling of slag at the inner wall of the burner is substantially avoided.

A more specific object of the invention is to provide an oxidation process with no recirculation of ash and unburned carbon to improve the overall efficiency of the gasification process.

These and other objects of the invention are obtained by means of a process for the oxidation of a hydrocarbon feedstock, comprising the steps of gasification, oxidation and removal of carbon by forming a soot water slurry containing unburned carbon and ash and filtration of the soot water slurry to form a filtercake of carbon and ash, wherein the filtercake is dried by means of a fluid bed and the dried filtercake is burned at temperatures between 600° C. and 1000° C.

Further essential features of the invention are as defined in the accompanying claims and will also appear from the detailed description of the invention below.

BRIEF DESCRIPTION OF THE DRAWINGS

As shown in FIG. 1 a mixture of hydrocarbon feedstock such as oil, oxygen and steam is supplied through lines 1, 2 and 3 to a reactor in which the partial oxidation takes places. Typically this partial oxidation is performed at 1350° C. under a pressure of 40–80 bar.

Figure 1:
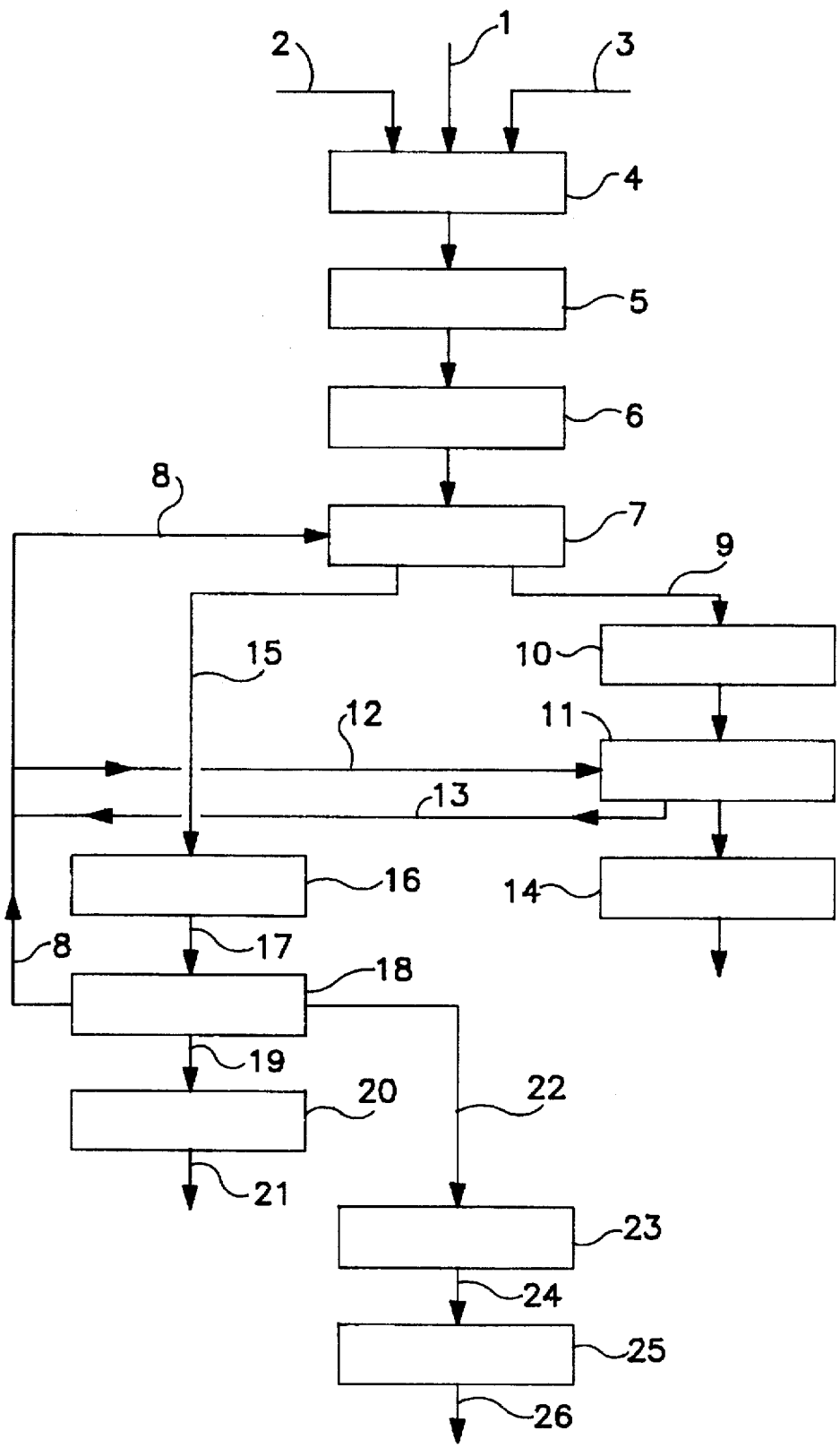
FIG. 1 a representation of a simplified flow sheet of the process for partial oxidation of hydrocarbon feedstock in which the process according to the invention can be applied.

A typical composition of the gaseous reaction products is 48% $H_2$, 48% CO, 2.5% $CO_2$ and 1.5% $H_2S$.

The heat generated by the partial oxidation is recovered in a heat exchanger 5 and an economizer 6 whereupon the reaction products are transported to a water quench apparatus 7. Here the reaction products are washed with water supplied through line 8, as a result of which the ash is separated from the gaseous reaction products.

The gaseous reaction products are fed through line 9, through another economizer, 10, whereupon they are fed to a scrubber 11, in which they are scrubbed for a second time by means of water supplied through line 12 and returned through line 13.

The gaseous reaction products are thereupon fed to a $H_2S$-removal station 14, from which the gaseous reaction products can be supplied to their final use process, such as a gas turbine installation or a chemical process such as an ammonia plant.

The liquid phase originating from the water quench apparatus 7 and containing essentially ash, soot and water is fed through line 15 to an intermediate storage tank 16, acting as a buffer for the further treatment of the mixture of ash, soot, and water.

Basically, the further treatment of the aqueous phase consists of the steps of filtration, drying and burning after which the ash is ready for further treatment in a metallurgical plant for recovery of vanadium.

As shown in FIG. 1, the aqueous phase containing water, ash and soot is fed through line 17 to a filtration system 18 which will be further described in more detail.

In the filtration system the ash/soot is dried to a solid/liquid ratio of 20/80% by weight. The water separated from the aqueous mixture is partly returned to the water quench system 7 through line 8, and the surplus is fed through line 19 to a device 20 for removing HCN from the discharge water. From device 20 the water can be sent to the regular waste water system through line 21. The amount of water returned to the device 7 through line 8 might be for example 80% of the water leaving the filtration system, which means that about 20% water is sent through line 19 to the HCN removal device 20.

As shown in FIG. 1 lines 12 and 13 serving the scrubber 11 with water are both connected to line 8, so that the scrubber 11 is operated by water directly originating from the filtration system 18.

The ash/soot mixture leaving the filtration system 18 through line 22 is supplied to a drying station 23 to be described in more detail further, whereas the ash/soot is dried to nearly 100% solid. After drying the ash/soot mixture is fed through line 24 to a burning installation 25 wherein the carbon present in the ash/soot mixture is burned so that the carbon content is reduced to a level of 3–5% by weight. The burning itself takes place under controlled operating conditions, for example at a temperature of 800–850° C. and a controlled residence time so that the formation of $V_2O_5$ can be avoided. The burned ash/soot mixture is further removed through line 26 and can be transported to a metallurgical process for recovery of the vanadium present in it.

Figure 2A:
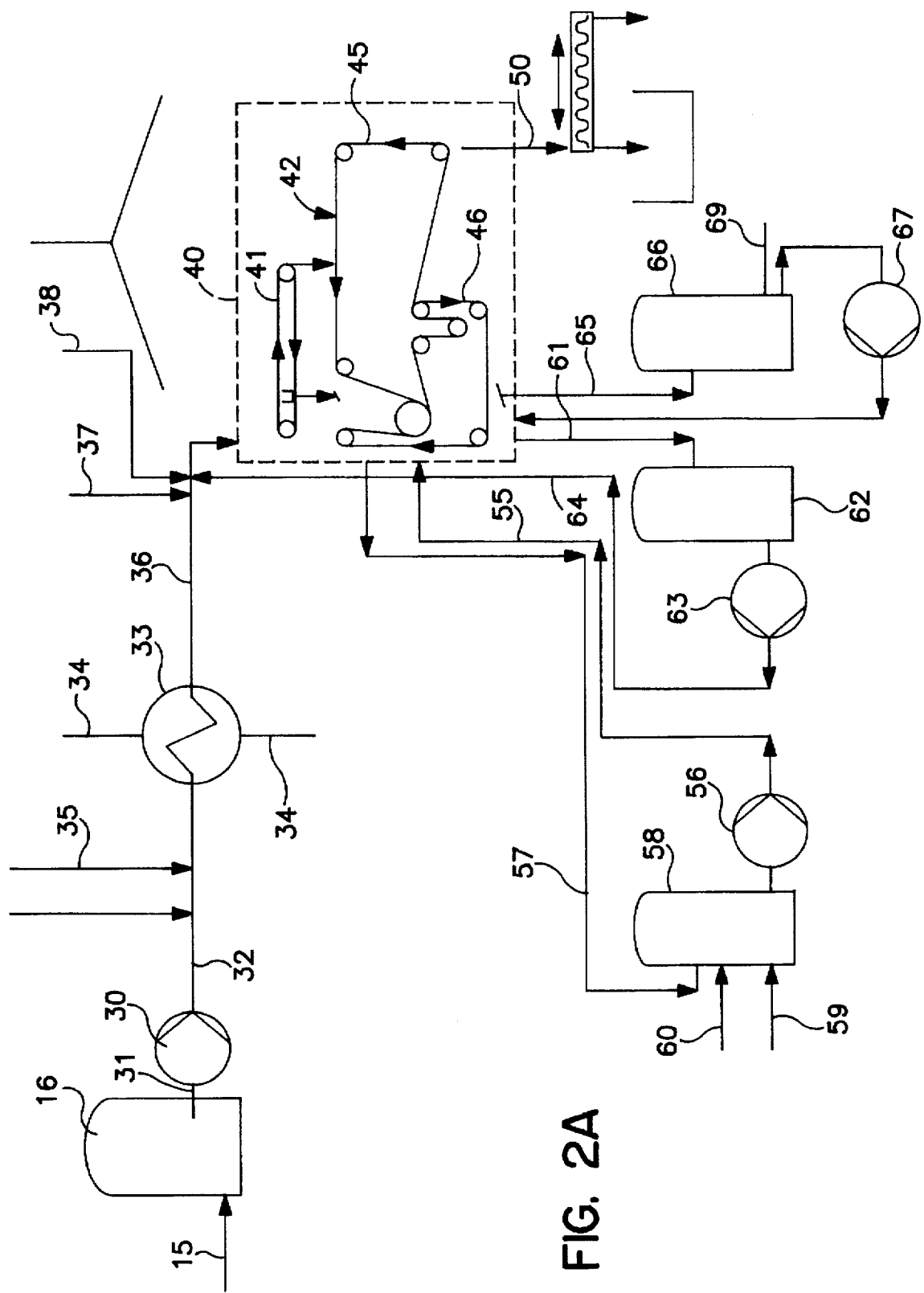
FIG. 2A–2D a representation of the flow sheet of the system to be used in the ash/soot treatment according to the invention.

In FIG. 2A is shown a flow sheet of an installation for performing the filtration of the mixture ash/soot/water. The soot water is supplied to the intermediate storage vessel 16 through line 15. The soot water may for example contain 4 g/l solid. In the storage vessel the soot water is flashed at a temperature of about 120° C. The soot water is pumped by means of a pump 30 and lines 31 and 32 to a heat exchanger 33, in order to cool the soot water to a temperature of about 45° C. The heat is transferred to water supplied through lines 34 and steam is generated which can be used in other places in the process, e.g. for preheating air.

In view of the low temperature it is possible that calcium carbonate precipitation takes place at the inner wall of the tubes and heat exchanger. This can be avoided by the addition of a dispersing agent through line 35.

From the heat exchanger the soot water is supplied to the filtration unit 40 through line 36. In order to improve the filtration a flocculent may be added to the soot water.

Preferably a cationic and an anionic flocculent are added to the soot water through lines 37 and 38 respectively.

The filtration unit 40 comprises a first belt filter 41 and a press filter 42. The belt filter 41 comprises a continuous sieve belt running through an endless path around two rollers. The solids are retained by the belt sieve, whereas water is allowed to be removed by gravity. The solid content of the filter mass retained on the belt will be about 3% by weight. The filtrate collected by a gutter under the belt sieve contains less than 40 mg/l solids. It can directly be recycled as scrubber-feed water to the process.

The soot emulsion left on the sieve belt 41 falls down on to the pressure sieve 42 consisting of two endless sieve belts 45 and 46 each running around a number of rollers, and being in contact with each other in at least a part of their transport paths.

These types of pressure filtration means are usual in the art. Herein the soot is dried especially in the pressure zone, when the two sieves belts run in parallel paths, so that the soot contains above 80% solid. This soot leaves the filtration through a line 80.

A typical composition of the soot after filtration may be

Water 80%

Solid 20%

The composition of the solid soot is shown in Table 1.

TABLE I

| Composition (% by weight) | C | 65.0 |
|---|---|---|
| | S | 1.7 |
| | Fe | 1.4 |
| | Ni | 2.1 |
| | V | 15.3 |
| | Mo | 0.3 |
| | Alkali | 0.3 |
| | Alkali earth | 1.0 |
| | Si | 0.5 |
| | Anions | rest |

It is possible that the calcium carbonate present in the soot will precipitate during filtration, and therefor can obstruct the filter sieves. Therefore the surface of the sieves is pickled in a discontinuous way by means of acetic acid supplied through line 55 by means of pump and returned through line 57 to a storage vessel 58. The amount of acetic acid in the vessel 58 is maintained by addition of acetic acid and water through line 59 and 60.

The main stream of the filtrate is drained through line 65 into a storage vessel 66. From there it is recycled to the gasification process (line 69) to serve again as scrubber— and quench water and to be finally loaded again with process soot. A side stream out of the vessel is pumped by pump 67 through line 68 into the filtration unit to serve as spraying water on the filtration belt. Another side stream, recollected at the bottom of the filtration unit 40 is fed through line 61 into a storage vessel 62. From here the water is pumped by pump 63 through line 64 to the entrance of the soot/water mixture into the filtration unit 40.

Figure 2B:
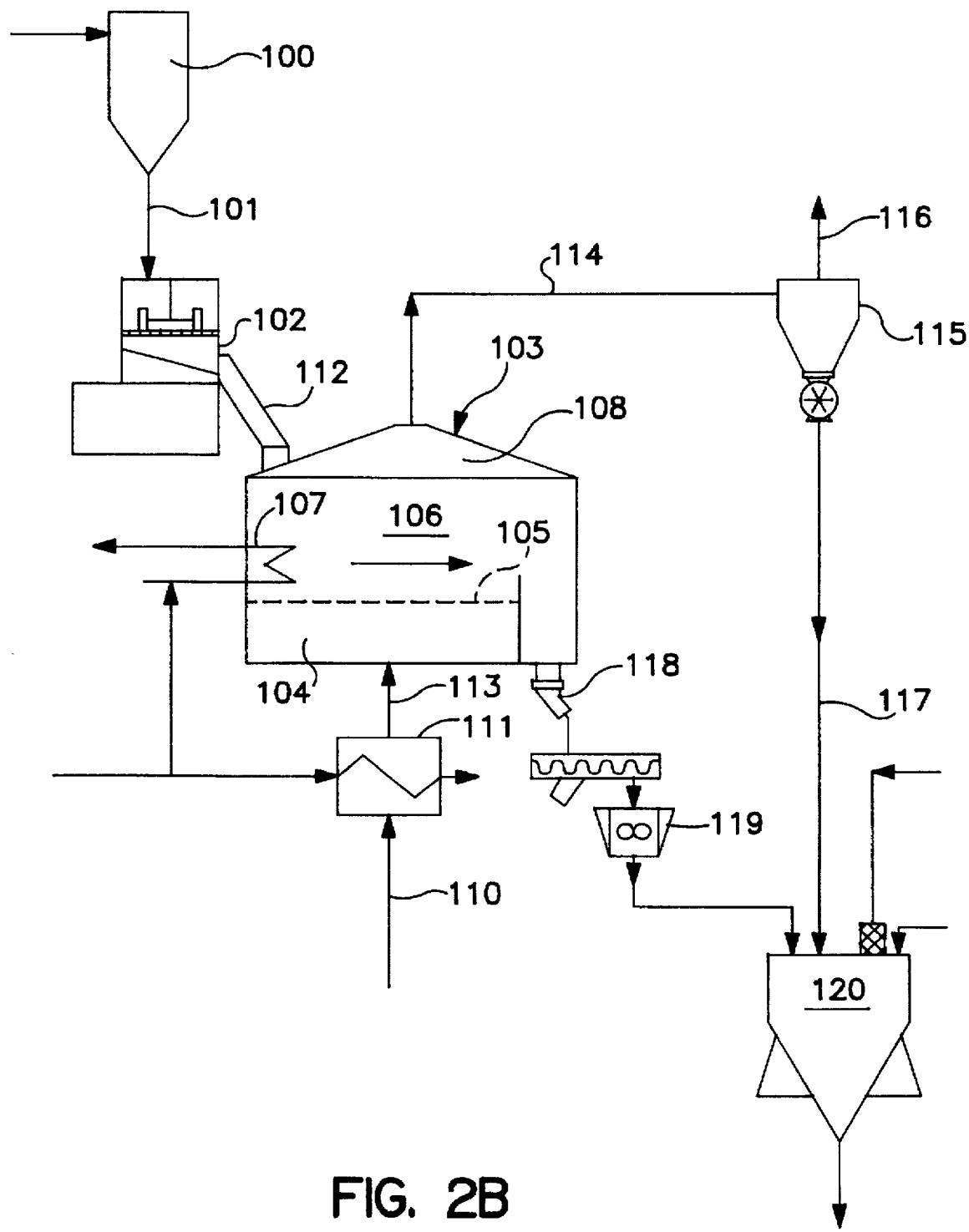

In the next step of the process, more specifically shown in FIG. 2B, the filtercake is dried further, so that the combustion is improved, especially more heat generated. The $H_2S$ freed during drying is absorbed in the washing water and recycled to the process, thereby reducing the S-content in the dry soot product.

From the filtration unit 40, the filtercake, containing approximately 20% solid is fed through line 50 to an intermediate storage vessel 100. From the bottom of the intermediate storage vessel the filtercake is fed through line 101 to a granulating device, 102 wherein it is transformed into granules with fixed dimensions (e.g. cylindered particles with a diameter of 3 mm and a length of 3 mm).

The granulation step is done in order to obtain uniform particles, which guarantee a uniform end product after drying.

The drying apparatus 103 is of the fluid bed type and comprises three portions, the gas portion 104 having a sieve-like wall 105 for the equalized distribution of the gas, an intermediate portion 106 wherein heating pipes 107 are mounted and where the fluid bed is actually built up and a sucking head 108.

An fluidizing gas such as $N_2$, steam $CO_2$, air with low $O_2$ content, is supplied through line 110, heated in a heat exchanger 111 preferably to a temperature of at least 150° C., more preferably at least 180° C., and through line 113 supplied to the gas portion 104 of the device 103. The soot product is fluidized by this gas stream and is dried by the heated gas and by the heat supplied through the pipes 107. The granulated filtercake itself is supplied through pipe 112 from the granulating device 102 into the drying device 103, in FIG. 2B the left part of it. The particles fall from above in the fluid bed layer and are gradually transported to the right hand side (as seen in FIG. 2B) where the particles are allowed to fall. The small particles of the granulated filtercake which constitute about 20-25% by weight of the granulated filtercake are carried along with the fluidizing gas and leave the fluid bed installation through pipe 114 into a cyclone 115, where the fine particles are separated from the fluidizing gas. The fluidizing gas leaves the cyclone 115 through line 116, the fine particles through line 117.

The other dried particles which are heavy enough not to be carried along with the fluidizing gas, leave the fluid bed through the outlet 118. They are crushed in a mill 119 and the generated small particles or dust are collected in a vessel 120, in which also the solid dust from cyclone 115 is transported through line 117. The particle-size is classified as being 85%, by weight less than 90 μm.

Figure 2C:
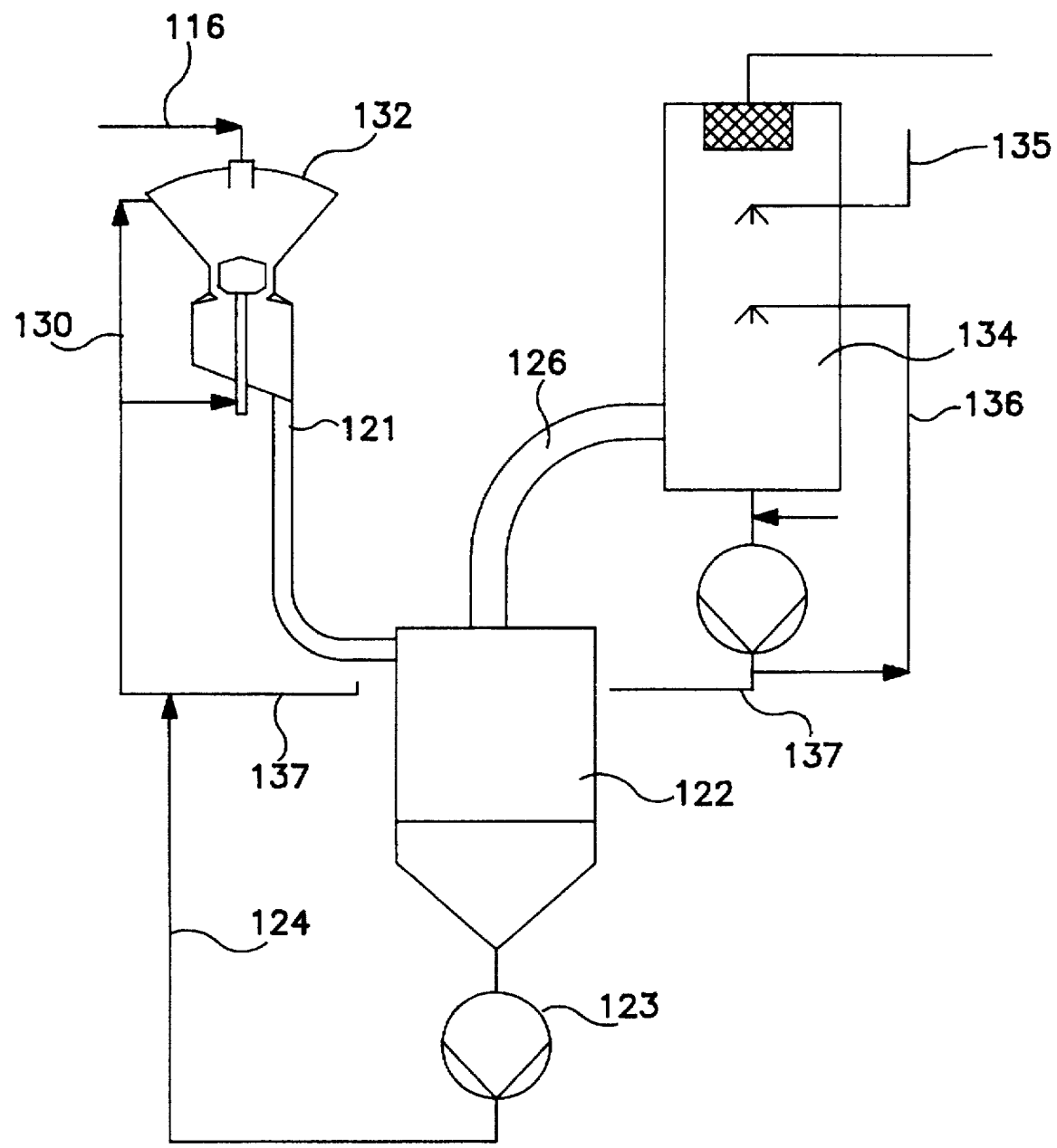

The treatment of the fluidizing gas coming from the cyclone 115 and still containing small particles of the granulated filtercake is done by means of the process shown in FIG. 2C. The fluidizing gas is fed through line 116 to a Venturi-washing unit 132 where it is treated with water supplied through line 130.

At the same time the mixture is cooled to a temperature well below 100° C., e.g. 35° C., so that 80% of the water is condensed. The gas/water mixture obtained in the Venturi-device 132 is fed through line 121 to a cyclone 122, where the water is substantially removed from the mixture and collected at the bottom, from which it is returned to the Venturi device through pump 123 and line 124. The gas phase from the cyclone 122 is fed through pipe 126 to a washing unit 134. Here the gas is washed again, either by process water supplied through line 135 and by recycled wash water with low soot content supplied through line 136.

The wash water is collected at the bottom of the device and partly returned through pump 137 and line 136 and partly used as supply water for the venturi-washing unit 132 through line 137 and 130. The gas phase is collected in the top of the washing device 134 and returned to the fluid bed unit.

Figure 2D:
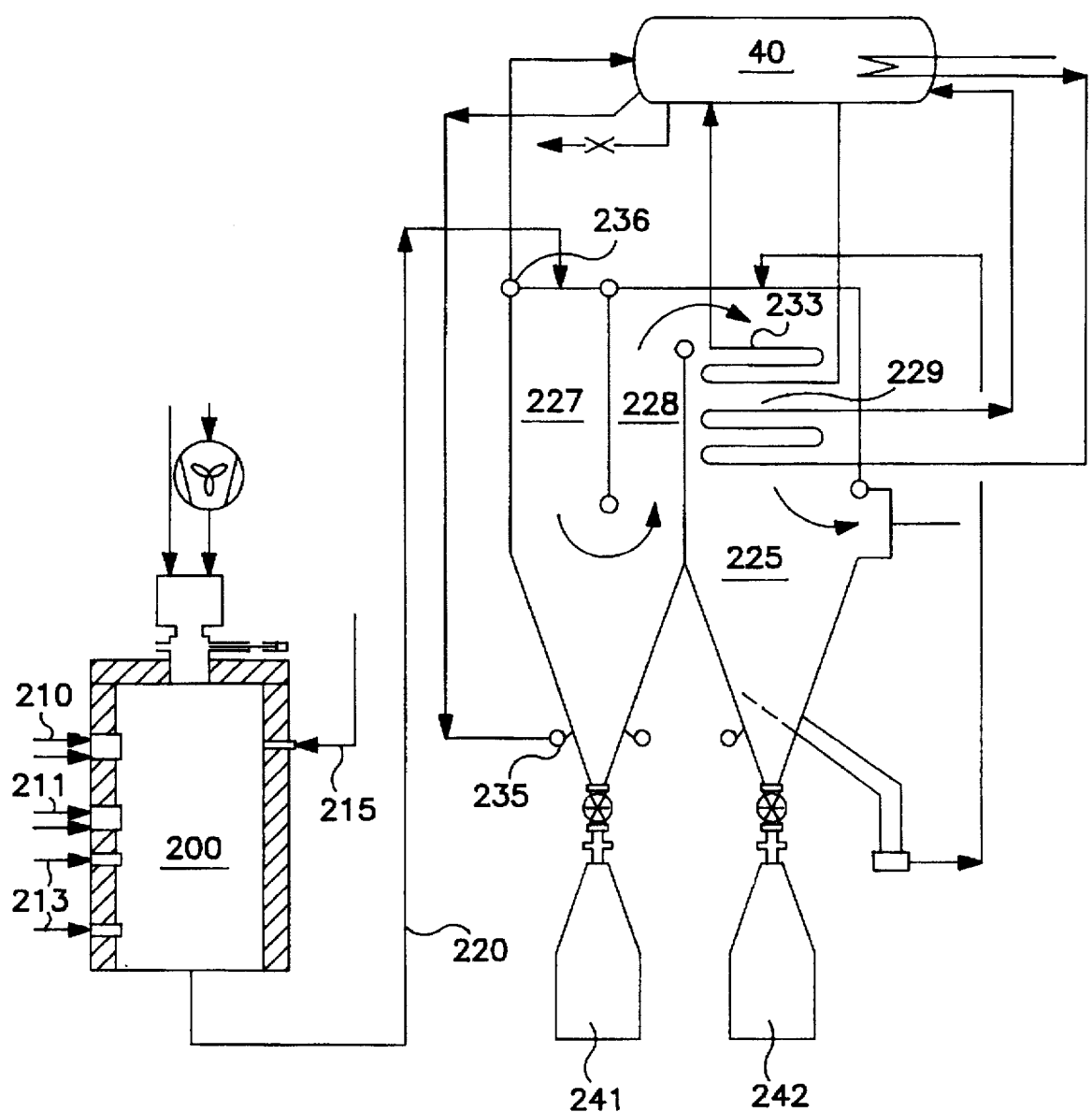

The next step in the process is the burning of the soot/ash mixture, as obtained as dry dust in the container 120. This part of the process is represented in FIG. 2D. The object of the burning is the reduction of the carbon-content, in order to make an ash suitable for the recovery of the 5 to 15% by weight of the vanadium contained therein.

The burning itself is preformed in the reactor 200, to which the ash is transported by means of combustion air, which is mixed with the soot powder. The burning must be performed under well controlled circumstances so that forming of vanadium pentoxide can be avoided. For that reason the burning is done as a partial oxidation, 95-98% of the carbon being burned, so that 2-5% weight of carbon is still present in the ash after the burning. The partial oxygen pressure is therefore maintained at $10^{-7}$, $10^{-8}$ bar at temperature between 600° C. and 1000° C., so that no forming of vanadium pentoxide can occur.

Preferably the temperature is maintained between 700°-900° C., more preferably between 700°-850° C., so that most of vanadium is transformed according to oxidation step IV, the end product of which having a high melting point (above 1300° C.).

The reactor 200 itself is designed as a centrifugal burner. The soot/ash mixture is injected on two levels 210 and 211 through slots which are tangentially oriented with respect to the cylindrical burning chamber. Moreover a number of tangential air slots 213 are provided, so that an air cushion is built up between the wall and the burning ash. Start up of the burning is done by means of a gas burner 215. The wall temperature can be maintained below 300° C. The shape of the burning is helicoidal. The combustion gas leaves the burner at temperatures of 800°-850° C. through a line 220 to be fed to a boiler 225.

In the boiler the burning gases are cooled to about 200° C. in order to produce steam. The difficulty here is to avoid the deposit of vanadium ashes on the walls of the boiler. The boiler comprises three parts 227, 228 and 229. The parts 227 and 228 are radiation parts, part 227 with descending gas and part 228 with ascending burning gas and the walls are double walled with natural water flow for preheating the water as indicated by the input point 235, and outlet point 236. The steam produced is 19 bar steam with a temperature below 300° C., so that there is no tendency for the ash to settle down on the walls. In the conversion part 218, the burning gas is in contact with heating pipe 233 for the heat transfer to water/steam, which heating pipes are also connected to a water reservoir 240.

Ash carried along with the burning gases is separated therefrom and is allowed to fall down and is collected in containers 241 and 242. The collected ash can be used directly in a vanadium recovery process, as a natural—or—substitute.

EXAMPLE

In an installation of the type described above and using a soot with the composition according to Table I, the end results were as follows:

| containing ash: | ca. 5–6% of amount after filtration | |
|---|---|---|
| | Analyze in | by weight |
| | C | 2.0 |
| | S | 0.5 |
| | Fe | 4.1 |
| | Ni | 6.2 |
| | V | 46.2 |
| | Mo | 1.0 |
| | Alkali | 1.0 |
| | Alkali earth | 3.2 |
| | Si | 1.5 |
| | Anions | 34.4 |
| Gas emissions | $H_2O$ | 0,55 Vol % |
| | $CO_2$ | 6,81 Vol % |
| | $O_2$ | 13,89 Vol % |
| | $N_2$ | 78,65 Vol % |

No waste water. Positive stream production.

Although the invention has been described in more detail with respect to the treatment of ash originating from a partial oxidation/gasification process, it is clear that the invention is not restricted to such an ash, but that other ash originating from other oxidation processes can be used as well, provided they contain at least 60% by weight carbon.

We claim:

1. A process for partial oxidation of a hydrocarbon feedstock, comprising the steps of gasification, partial oxidation and removal of carbon by forming a soot water slurry containing unburned carbon and ash, and filtration of the soot water slurry to form a filtercake of carbon and ash, wherein the filtercake is granulated and then dried by means of a fluid bed dryer, and the granulated, dried filtercake is burned at temperatures between 600° C. and 1000° C.

2. A process according to claim 1, wherein the fluid bed dryer is operated by means of a fluidizing gas.

3. A process according to claim 2, wherein the fluidizing gas is $N_2$, steam, $CO_2$ or air with a lower than normal $O_2$ content.

4. A process according to claims 2 or 3, wherein the fluidizing gas has a temperature of at least 150° C.

5. A process according to claim 4, wherein the fluidizing gas has a temperature of at least 180° C.

6. A process according to claims 1 or 2, wherein the granulated, dried filtercake is burned at temperatures between 700° C. and 900° C.

7. A process according to claim 6, wherein the granulated, dried filtercake is burned at temperatures between 700° C. and 850° C.

8. A process according to 1 or 2, wherein the burning is under such circumstances that 2–5% by weight of carbon is left in the resulting ash.

9. A process for drying a soot-containing slurry originating from partial oxidation of a hydrocarbon feedstock, which comprises drying the slurry in a fluid bed dryer at a temperature of at least 150° C. using a fluidizing gas.

10. A process according to claim 9, wherein the fluidizing gas is $N_2$, steam, $CO_2$ or air with a lower than normal $O_2$ content.

11. A process for combustion of soot containing 5 to 15% by weight vanadium originating from partial oxidation of a hydrocarbon feedstock, which comprises burning the soot at a temperature between 700° and 850° C.

* * * * *